United States Patent
Huang et al.

(10) Patent No.: US 10,221,839 B2
(45) Date of Patent: Mar. 5, 2019

(54) CONTROL VALVE FOR POURING COLOR PASTE IN BOTH LARGE AMOUNT AND SMALL AMOUNT

(71) Applicant: ZHENGZHOU SANHUA TECHNOLOGY & INDUSTRY CO., LTD, Xingyang (CN)

(72) Inventors: Song Huang, Xingyang (CN); Weihong Niu, Xingyang (CN)

(73) Assignee: ZHENGZHOU SANHUA TECHNOLOGY & INDUSTRY CO., LTD, Xingyang (CN)

( * ) Notice: Subject to any disclaimer, the term of this patent is extended or adjusted under 35 U.S.C. 154(b) by 0 days.

(21) Appl. No.: 15/537,797

(22) PCT Filed: Dec. 18, 2015

(86) PCT No.: PCT/CN2015/097974
§ 371 (c)(1),
(2) Date: Jun. 19, 2017

(87) PCT Pub. No.: WO2016/095866
PCT Pub. Date: Jun. 23, 2016

(65) Prior Publication Data
US 2017/0349426 A1   Dec. 7, 2017

(30) Foreign Application Priority Data

Dec. 19, 2014  (CN) ........................... 2014 1 0792472
Dec. 19, 2014  (CN) ........................... 2014 1 0792479
Dec. 19, 2014  (CN) ........................... 2014 1 0792555

(51) Int. Cl.
*B67D 7/02* (2010.01)
*F04B 15/02* (2006.01)
(Continued)

(52) U.S. Cl.
CPC .......... *F04B 13/00* (2013.01); *B01F 15/0462* (2013.01); *B67D 7/0277* (2013.01);
(Continued)

(58) Field of Classification Search
CPC ........ B67D 7/0277; F04B 53/10; F04B 15/02; F04B 19/22; F04B 9/111; F04B 23/02;
(Continued)

(56) References Cited

U.S. PATENT DOCUMENTS 4,027,785 A      6/1977  Edstrom et al.
5,078,302 A *    1/1992  Hellenberg ......... B01F 13/1058
                                                      141/104
(Continued)

FOREIGN PATENT DOCUMENTS

CN       103968106       8/2014
EP         1908510       4/2008
(Continued)

OTHER PUBLICATIONS

International Search Report, issued in the corresponding PCT/CN2015/097974, dated Mar. 24, 2016, 4 pages.

*Primary Examiner* — Frederick C Nicolas
(74) *Attorney, Agent, or Firm* — Hamre, Schumann, Mueller & Larson, P.C.

(57) ABSTRACT

A control valve includes a valve body and a valve element disposed in the valve body. The valve body is provided with a large pump inlet-outlet opening, a small pump inlet-outlet opening, a colorant bucket inlet-outlet opening and a colorant dispensing outlet. The valve core, which is provided with a passage, is rotated to allow connection of the large pump inlet-outlet opening and the small pump inlet-outlet opening with a colorant bucket or dispensing thereof, with at least three connecting structures being involved. The control valve is compact in structure and ingenious in
(Continued)

design, and may fully achieve the objective of dispensing of large amount colorant or a small amount colorant by rotating the valve core; moreover, the objectives of cleaning the pump and preventing colorant drying and hardening in a colorant circulating pipe and a colorant outlet may be achieved.

8 Claims, 12 Drawing Sheets

(51) Int. Cl.
| | | |
|---|---|---|
| F04B 19/22 | (2006.01) | |
| F16K 11/085 | (2006.01) | |
| F16K 31/04 | (2006.01) | |
| F04B 13/00 | (2006.01) | |
| F04B 9/111 | (2006.01) | |
| F04B 27/12 | (2006.01) | |
| B01F 15/04 | (2006.01) | |
| F04B 5/00 | (2006.01) | |
| F04B 7/00 | (2006.01) | |
| F04B 23/02 | (2006.01) | |
| F04B 49/22 | (2006.01) | |
| F04B 53/10 | (2006.01) | |
| B01F 13/10 | (2006.01) | |

(52) U.S. Cl.
CPC .............. *F04B 5/00* (2013.01); *F04B 7/0003* (2013.01); *F04B 9/111* (2013.01); *F04B 19/22* (2013.01); *F04B 23/02* (2013.01); *F04B 27/12* (2013.01); *F04B 49/22* (2013.01); *F04B 53/10* (2013.01); *F16K 11/085* (2013.01); *F16K 31/041* (2013.01); *B01F 13/1055* (2013.01); *B01F 2215/005* (2013.01); *F04B 15/02* (2013.01)

(58) Field of Classification Search
CPC .. F04B 13/00; F04B 49/22; F04B 5/00; F04B 7/0003; F04B 27/12; F16K 11/085; F16K 31/041; B01F 15/0462; B01F 13/1055; B01F 2215/005
See application file for complete search history.

(56) References Cited

U.S. PATENT DOCUMENTS

| | | |
|---|---|---|
| 8,240,513 B2 | 8/2012 | Voskuil et al. |
| 2003/0146244 A1* | 8/2003 | Sanders .................. G01F 11/22 |
| | | 222/333 |
| 2009/0236367 A1 | 9/2009 | Voskuil et al. |
| 2017/0350377 A1* | 12/2017 | Huang .................... F04B 13/00 |

FOREIGN PATENT DOCUMENTS

| | | |
|---|---|---|
| IT | 1376547 | 6/2010 |
| WO | 2014139135 | 9/2014 |

* cited by examiner

CONTROL VALVE FOR POURING COLOR PASTE IN BOTH LARGE AMOUNT AND SMALL AMOUNT

TECHNICAL FIELD

The present invention relates to the technical field of color matching for paints, and specifically, to a control valve for pouring color paste in both large amount and small amount.

BACKGROUND ART

In the technical field of color matching, it is a key technique to dispense quantitative colorant by means of a reciprocating pump. At present, piston pumps, plunger pumps, folding pumps and the like are common reciprocating positive displacement pumps. Each of the pumps generally consists of a cylinder, a piston rod, a piston, and a colorant outlet, with the piston pump as an example. A strict requirement is made to the volume of a colorant in color matching, i.e., a requirement that an error of the dispensed volume of a colorant cannot exceed a certain percentage (e.g., less than 1%) when a pump dispenses abundant colorant (e.g., greater than 15 ml), and an error of the dispensed volume of a colorant cannot exceed a certain percentage (e.g., less than 12%) either with regard to the dispensing of a trace amount of colorant (e.g., less than 0.5 ml). To achieve this objective, two colorant dispensers may be used: one is a colorant dispenser consisting essentially of a large pump that is mainly used for dispensing abundant colorant, and the other one is a colorant dispenser consisting essentially of a small pump that is mainly used for dispensing a trace amount of colorant; alternatively, a pair of pumping-out systems of both abundant dispensing and trace amount of dispensing are disposed in parallel by connecting a large pump having a large-section cylinder with a small pump having a small-section cylinder in parallel in the same pump. The above-mentioned methods both have the problems of large occupied space, complicated structure, and high cost; therefore, a small piston rod may be fixedly connected under a piston rod with a small cylinder matching with a small reciprocating lever being disposed in a cylinder and provided with a colorant outlet, and then the objective of dispensing of abundant colorant or a trace amount of colorant is achieved by means of the reciprocating motion of the large piston rod and the small piston rod (taking, but not limited to, a piston pump for example). However, a three-way change valve applicable to general colorant dispensing pumps, when applied to such a pump capable of dispensing abundant colorant as well as a trace amount of colorant, cannot meet the requirements for use. A change valve, which is disclosed in patent No. CN201310045508.9, may effectively solve the problems of colorant drying and hardening at a colorant outlet and colorant deposition in a colorant outlet pipe with improved colorant dispensing accuracy, but it cannot meet the requirements for use of such a pump capable of dispensing abundant colorant as well as a trace amount of colorant.

SUMMARY OF THE INVENTION

An objective of the present invention is to overcome the technical shortcomings of the prior art to provide a control valve for pouring color paste in both large amount and small amount.

The objective of the present invention is achieved by means of the following technical solutions: The control valve for pouring color paste in both large amount and small amount, comprising a valve body and a valve core disposed in the valve body, wherein the valve body is provided with a large pump inlet-outlet opening, a pump inlet-outlet opening, a colorant bucket inlet-outlet opening, and a colorant dispensing outlet; the valve core, which is provided with a passage, is rotated to allow connection of the large pump inlet-outlet opening and the small pump inlet-outlet opening with a colorant bucket or dispensing thereof, with at least the following three connecting structures being involved:

(1) where the large pump inlet-outlet opening connects with the colorant bucket; the small pump inlet-outlet opening connects with the colorant bucket; the large pump inlet-outlet opening and the small pump inlet-outlet opening both connect with the colorant bucket; and the three ways are for single or combined use;

(2) where single dispensing via the large pump inlet-outlet opening or dispensing via both the large pump inlet-outlet opening and the small pump inlet-outlet opening is allowed; alternatively, the large pump inlet-outlet opening connects with the colorant dispensing outlet for dispensing, or the large pump inlet-outlet opening and the small pump inlet-outlet opening both connects with the colorant dispensing outlet for dispensing;

(3) where single dispensing via the small pump inlet-outlet opening is allowed, or the small pump inlet-outlet opening connects with the colorant dispensing outlet for dispensing.

Single dispensing via the large pump inlet-outlet opening, joint dispensing via both the large pump inlet-outlet opening and the small pump inlet-outlet opening, or single dispensing via the small pump inlet-outlet opening means that with no need of the colorant dispensing outlet on the valve body, the passage of the valve core connects with the large pump inlet-outlet opening, the passage of the valve core connects with both the large pump inlet-outlet opening and the small pump inlet-outlet opening, or after the passage of the valve core connects with the small pump inlet-outlet opening, dispensing is achieved via the passage of the valve core.

The control valve for pouring color paste in both large amount and small amount comprises a valve body and a valve core. The valve body is provided with a large pump inlet-outlet opening, a small pump inlet-outlet opening, a colorant bucket inlet-outlet opening and a colorant dispensing outlet, wherein the colorant bucket inlet-outlet opening connects with a colorant bucket branch inlet-outlet opening I by means of a first branch passage and with colorant bucket branch inlet-outlet opening II by means of a second branch passage; the valve core is provided with an axial passage, and a radial passage I, a radial passage II, and a radial passage III respectively connect with the axial passage; the valve core is provided in surface thereof with an arc groove passage; the arc groove passage and the radial passage I correspond to the large pump inlet-outlet opening, and the axial passage connects with the small pump inlet-outlet opening by means of passages.

The axial passage connecting with the small pump inlet-outlet opening by means of passages means that the axial passage invariably connects with the small pump inlet-outlet opening; also:

(1) when the radial passage I connects with the colorant bucket branch inlet-outlet opening II, the radial passage I connects with the colorant bucket for suction of colorant; when the radial passage I connects with the colorant bucket passage branch inlet-outlet opening I; the arc groove passage and the radial passage I both connect with a colorant bucket passage inlet-outlet opening for suction of colorant;

(2) when the radial passage III is aligned to the colorant dispensing outlet, the radial passage I connects with the large pump inlet-outlet opening; that is, the large pump inlet-outlet opening and the small pump inlet-outlet opening both connect with the radial passage III by means of the axial passage, and the radial passage III dispenses abundant colorant with other passages being closed;

(3) when the radial passage II is aligned to the colorant dispensing outlet, the arc groove connects with the colorant bucket inlet-outlet opening I; that is, colorant from the large pump inlet-outlet opening returns; the small pump inlet-outlet opening connects with the axial passage that connects with the radial passage II, and the radial passage II dispenses a trace amount of colorant via the colorant dispensing outlet with other passages being closed.

The colorant bucket inlet-outlet opening is branched into the colorant bucket inlet-outlet opening I and the colorant bucket inlet-outlet opening III, both of which are located at the sides of the valve core, and further branched into a colorant bucket inlet-outlet opening III and a colorant bucket inlet-outlet opening IV, both of which are located at sides of the valve core; the colorant bucket inlet-outlet opening III and the colorant bucket inlet-outlet opening III correspond to the radial passage II and the radial passage III; (1) when the radial passage I connects with the colorant bucket passage inlet-outlet opening II, the radial passage III connects with the colorant bucket branch inlet-outlet opening III, while the radial passage II connects with the colorant bucket branch inlet-outlet opening IV, and the small pump inlet-outlet opening connects with the colorant bucket for suction of colorant; (2) when the radial passage I connects with the colorant bucket passage inlet-outlet opening I, the radial passage III connects with the colorant bucket branch inlet-outlet opening IV, while the radial passage II connects with the colorant bucket branch inlet-outlet opening III, and the large pump inlet-outlet opening and the small pump inlet-outlet opening connect with the colorant bucket for suction of colorant.

The control valve comprises a valve body II and a valve core II. The valve body II is provided with the large pump inlet-outlet opening and the small pump inlet-outlet opening, the colorant bucket inlet-outlet opening and the colorant dispensing outlet, wherein the colorant bucket inlet-outlet opening connects with the colorant bucket branch inlet-outlet opening I by means of the first branch passage and with the colorant bucket branch inlet-outlet opening II by means of the second branch passage, and the colorant bucket inlet-outlet opening is provided with a third branch passage; the valve core II is provided with an axial passage; the radial passage I, the radial passage II, and the radial passage III respectively connecting with the axial passage; the valve core is provided in the surface thereof with the arc groove passage; the arc groove passage and the radial passage I correspond to the large pump inlet-outlet opening, and a radial small pump passage I, a radial small pump passage II, a radial small pump passage III and an axial small pump passage are disposed axially spaced apart by 90 degrees on a part of the axial passage that corresponds to the small pump inlet-outlet opening (6); the axial passage connecting with the small pump inlet-outlet opening by means of passages means that the small pump inlet-outlet opening respectively connects with the radial small pump passage I, the radial small pump passage II, and the radial small pump passage III; also:

(1) when the radial passage I connects with the colorant bucket branch inlet-outlet opening II, the radial passage I is connected, and the arc groove passage connects with the colorant bucket passage branch inlet-outlet opening I; the small pump inlet-outlet opening connects with the colorant bucket inlet-outlet opening by means of the axial small pump passage for suction of colorant with other passages being closed;

(2) when the radial passage III is aligned to the colorant dispensing outlet, the large pump inlet-outlet opening connects with the axial passage by means of the radial passage I, while the small pump inlet-outlet opening connects with the axial passage by means of the radial small pump passage III; that is, the large pump inlet-outlet opening and the small pump inlet-outlet opening both connects with the axial passage by means of the radial passage III, and the radial passage III dispenses abundant colorant with other passages being closed.

(3) when the radial passage II is aligned to the colorant dispensing outlet, the arc groove connects with the colorant bucket inlet-outlet opening II; that is, colorant from the large pump inlet-outlet opening returns; the small pump inlet-outlet opening connects with the axial passage by means of the radial small pump passage I; the axial passage connects with the radial passage II, and the radial passage II dispenses a trace amount of colorant that is dispensed through the colorant dispensing outlet with other passages being closed.

Further, the colorant bucket inlet-outlet opening is branched into the colorant bucket inlet-outlet opening I and the colorant bucket inlet-outlet opening III, both of which are located at the sides of the valve core, and further branched into the colorant bucket inlet-outlet opening III and the colorant bucket inlet-outlet opening IV, both of which are located at the sides of the valve core; the colorant bucket inlet-outlet opening III and the colorant bucket inlet-outlet opening IV correspond to the radial passage II and the radial passage III; (1) when the radial passage I connects with the colorant bucket passage inlet-outlet opening II, the radial passage III connects with the colorant bucket branch inlet-outlet opening III, while the radial passage II connects with the colorant bucket branch inlet-outlet opening IV; (2) when the radial passage I connects with the colorant bucket passage inlet-outlet opening I, the radial passage II connects with the colorant bucket branch inlet-outlet opening III, while the radial passage III connects with the colorant bucket branch inlet-outlet opening IV.

The control valve disclosed in the present invention is compact in structure and ingenious in design, and may fully achieve the objective of dispensing of abundant colorant or a trace amount of colorant by rotating the valve core. Moreover, the objectives of cleaning the pump and preventing colorant drying and hardening in a colorant circulating pipe and a colorant outlet may be achieved. In addition, air in the pump or the valve body may be removed conveniently, thereby effectively guaranteeing the accuracy of the dispensed colorant.

DETAILED DESCRIPTION OF THE EMBODIMENTS

Figure 1A:
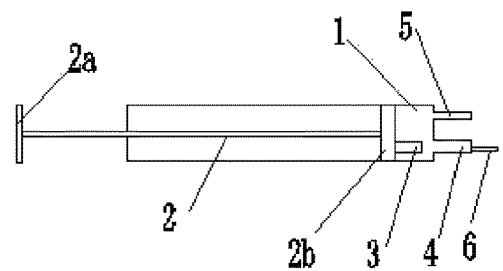
FIG. 1a is a diagram of a basic structure of a colorant pump to which a control valve in the present invention is applicable.
Figure 1B:
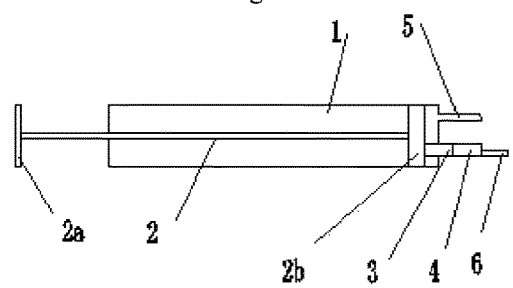
FIG. 1b is an operating diagram of the colorant pump to which the control valve in the present invention is applicable.

Descriptions will be made below in conjunction with accompanying drawings and embodiments. The control valve provided in the present invention is applicable to a control valve for pouring color paste in both large amount and small amount that, as shown in FIG. 1a and FIG. 1b, essentially consists of a volume-variable space I large pump or large cylinder 1, a large reciprocating part (comprising a large reciprocating lever 2, an energy applying end 2a of the large reciprocating lever 2, and a piston 2b driven by the large reciprocating lever 2), a volume-variable space small pump space II or small cylinder 4, a small reciprocating part or small reciprocating lever 3, a large pump inlet-outlet opening 5 and a small pump inlet-outlet opening 6; the large cylinder 1, the large reciprocating part, and the large pump inlet-outlet opening 5 constitute a large reciprocating positive displacement pump; the small reciprocating part, the small cylinder, and the small pump inlet-outlet opening 6 constitute a small reciprocating positive displacement pump; and the small reciprocating positive displacement pump and the large reciprocating positive displacement pump operate simultaneously. Of course, a person skilled in the art may also implement the present invention by using a packed plunger instead of the large reciprocating lever 2 and the piston 2b. As shown in FIG. 1a, when the small reciprocating lever 3 is not inserted into the small cylinder 4, dispensing of abundant colorant is achieved by means of the reciprocating motion of the large reciprocating lever 2 in the large cylinder 1, and suction or extrusion of the colorant in the large cylinder 1 are achieved via the small pump inlet-outlet opening 6 and the large pump inlet-outlet opening 5. As shown in FIG. 1b, when the small reciprocating lever 3 is inserted into the small cylinder 4, the volume of the colorant dispensed by the large reciprocating lever 2 in the large cylinder 1 is divided into two fractions: one is the dispensed volume via the small pump inlet-outlet opening, while the other fraction is the dispensed volume via the large pump inlet-outlet opening; thus, under the circumstance of dispensing via the small pump inlet-outlet opening and return to the colorant bucket via the large pump inlet-outlet opening, it is a trace amount of dispensing; and for dispensing via both the small pump inlet-outlet opening and the large pump inlet-outlet opening, it is abundant dispensing. The small reciprocating lever 3 forms a trace amount of colorant dispensing pump within the small cylinder 4, and a trace amount of colorant is dispensed via the small pump inlet-outlet opening 6, and in this case, the colorant in the large cylinder 1 is expelled into the colorant bucket via the large pump inlet-outlet opening 5, thereby achieving dispensing of a trace amount of colorant. In this figure, the axis of the small cylinder 4 is non-coaxial with that of the large cylinder 1. The length of the small reciprocating lever 3 extending into the small cylinder 4 is greater than or equal to the travel of the large reciprocating lever 2, and in this case, the small reciprocating lever 3 is invariably in the small cylinder 4. Also, the length of the small reciprocating lever 3 extending into the small cylinder 4 may be less than the travel of the large reciprocating lever 2.

Figure 2A:
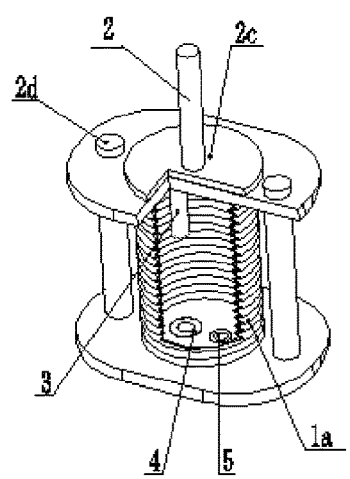
FIG. 2a is an operating diagram of a large pump when a colorant pump to which the control valve is applicable is a folding pump.
Figure 2B:
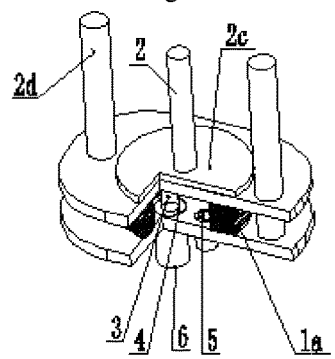
FIG. 2b is an operating diagram of a small pump when the colorant pump to which the control valve is applicable is the folding pump.

FIG. 2a and FIG. 2b are diagrams of a folding body 1a when the volume-variable space I is a folding pump, wherein the folding body 1a is a large pump. FIG. 2a shows the operating condition of the large pump when a small reciprocating lever 3 or small reciprocating part is not in a small pump (i.e., small cylinder 4), while FIG. 2b shows the operating condition of the small pump when the small reciprocating lever 3 is in the small cylinder 4. The operating principle thereof is the same as that in FIG. 1a and FIG. 1b, the folding body 1a is equivalent to the large pump 1, and the large reciprocating lever 2 and a large reciprocating plate 2c connected thereto constitute the large reciprocating part. Other parts include a small reciprocating part 3, a small pump 4, a large pump inlet-outlet opening 5, a small pump inlet-outlet opening 6, and a guiding column 2d. This embodiment is also the embodiment of the small pump 4 being non-coaxial with that of the folding body 1a.

Figure 2C:
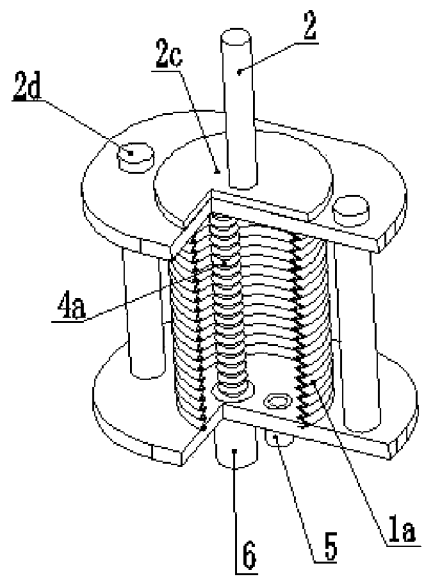
FIG. 2c is a diagram of the small pump being also the folding pump when the colorant pump to which the control valve is applicable is the folding pump.

As shown in FIG. 2c, the large reciprocating positive displacement pump is a large folding pump. The large reciprocating lever 2 and the large reciprocating plate 2c connected thereto constitute the large reciprocating part; the large reciprocating lever 2 drives the large reciprocating plate 2c into reciprocating motion along the guiding column 2d; the large pump inlet-outlet opening 5 is arranged in a base for the large folding pump 1a; a small folding pump 4a is disposed within the large folding pump 1a (i.e., large pump); the small pump inlet-outlet opening 6 is arranged in a base for the small folding pump 4a; and the small reciprocating part is partial plate surface of the large reciprocating plate 2c that corresponds to the small folding pump 4a.

Figure 3:
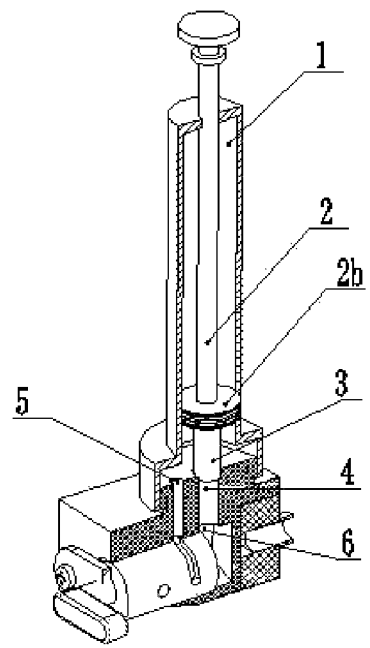
FIG. 3 is a diagram of a structure in which a large reciprocating lever is invariably in a small cylinder.
Figure 4:
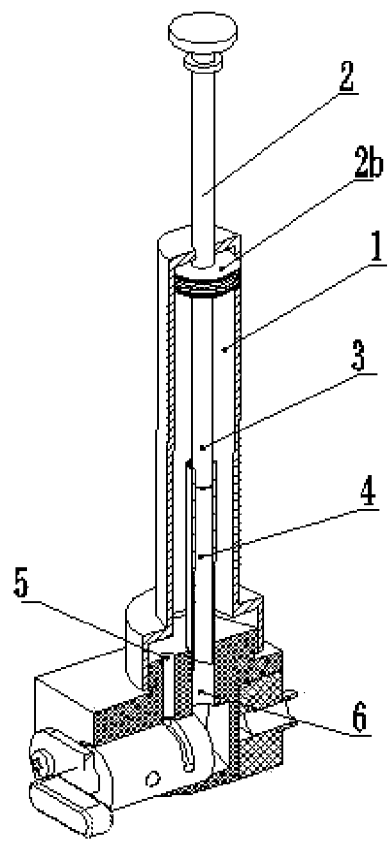
FIG. 4 is a diagram of a structure in which a large reciprocating lever is detachable from a small cylinder.

FIG. 3 and FIG. 4 show diagrams of an overall structure of a colorant pump capable of dispensing abundant colorant as well as a trace amount of colorant with the control valve in the present invention. The colorant pump is a piston pump comprising a large cylinder 1 (i.e., large pump) with a piston rod serving as the large reciprocating level 2. The piston rod may achieve suction or extrusion by means of the piston 2b, and the large reciprocating level 2 and the piston 2b constitute the large reciprocating part. A small reciprocating lever 3 extends from the piston 2b into the cylinder. A reciprocating pump constituted by the large cylinder 1 and the large reciprocating part is referred to as a large pump. Another cylinder is disposed in the base for the large cylinder 1, referred to as a small cylinder 4 (i.e., small pump). A hole may be directly bored in or a pipe may be disposed on the large cylinder 1 to serve as the small cylinder 4, and the large cylinder 1 and the small cylinder 4 are disposed coaxially, as shown in FIG. 3; the end, extending into the cylinder, of the large reciprocating lever 2 is connected to another reciprocating lever which is referred to as a small reciprocating lever 3 (i.e., small reciprocating part). The small cylinder 4 may match with the small reciprocating lever 3 to constitute a small pump. The small cylinder 4 is provided with a small pump inlet-outlet opening 6, while the large cylinder 1 is provided with a large pump inlet-outlet opening 5. The length of the small reciprocating lever 3 extending into the small cylinder 4 is greater than or equal to the travel of the large reciprocating lever 2, and in this case, the small reciprocating lever 3 is invariably in the small cylinder 4. Also, the length of the small reciprocating lever 3 extending into the small cylinder 4 may be less than the travel of the large reciprocating lever 2, as shown in FIG. 4, and in this case, the small reciprocating lever 3 may be detached from the small cylinder 4. A control valve may be provided for the large pump inlet-outlet opening 5 and the small pump inlet-outlet opening 6 to control connection thereof with a colorant bucket or dispensing thereof. FIG. 3 and FIG. 4 show an embodiment of a small cylinder 4 and a large cylinder 1 being disposed coaxially, thus allowing easier manufacturing and implementation.

The control valve for pouring color paste in both large amount and small amount comprises a valve body and a valve core disposed in the valve body. The valve body is provided with a large pump inlet-outlet opening 5, a small pump inlet-outlet opening 6, a colorant bucket inlet-outlet opening 8, and a colorant dispensing outlet 9; the valve core, which is provided with a passage, is rotated to allow connection of the large pump inlet-outlet opening and the small pump inlet-outlet opening with a colorant bucket or dispensing thereof, with at least the following three connecting structures being involved:

(1) where the large pump inlet-outlet opening connects with the colorant bucket; the small pump inlet-outlet opening connects with the colorant bucket; the large pump inlet-outlet opening and the small pump inlet-outlet opening both connect with the colorant bucket; and the three ways are for single or combined use;

(2) where single dispensing via the large pump inlet-outlet opening or joint dispensing via both the large pump inlet-outlet opening and the small pump inlet-outlet opening is allowed; alternatively, the large pump inlet-outlet opening connects with the colorant dispensing outlet colorant dispensing outlet for dispensing, or the large pump inlet-outlet opening and the small pump inlet-outlet opening both connect with the colorant dispensing outlet for dispensing;

(3) where single dispensing via the small pump inlet-outlet opening is allowed, or the small pump inlet-outlet opening connects with the colorant dispensing outlet for dispensing.

Figure 5A:
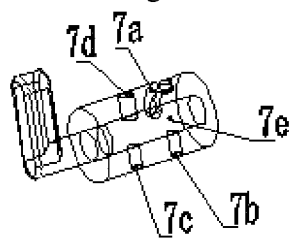
FIG. 5a is a structural diagram of a valve core of a first control valve.
Figure 5B:
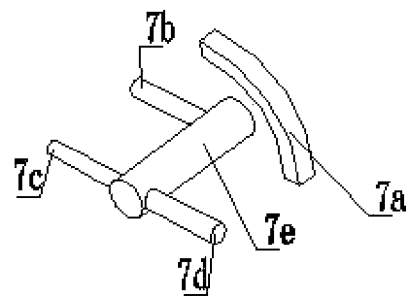
FIG. 5b is a diagram of a passage of the valve core passage of the first control valve.
Figure 6A:
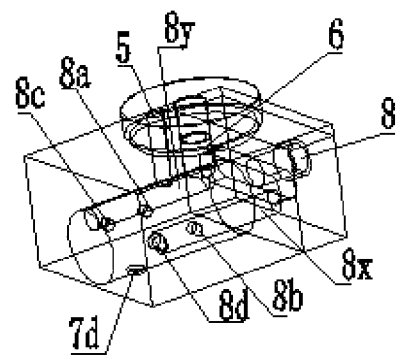
FIG. 6a is a structural diagram of a valve body of the first control valve.
Figure 6B:
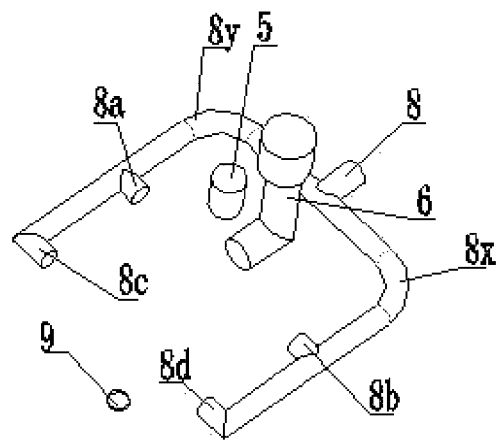
FIG. 6b is a diagram of a passage of the valve body of the first control valve.

To achieve such connecting structures, a first structure is given, as shown in FIG. 6a and FIG. 6b. FIG. 6b is a diagram of internal colorant passages of a valve body shown in FIG. 6a. The valve body is provided with the large pump inlet-outlet opening 5 and the small pump inlet-outlet opening 6, the colorant bucket inlet-outlet opening 8 and the colorant dispensing outlet 9. The valve body may be connected to the folding pump, the piston pump or the plunger pump as described above. The colorant dispensing outlet 9 may be a window or a notch in the lower end face of the valve body, and may also be a passage. Moreover, the colorant bucket inlet-outlet opening 8 connects with a colorant bucket branch inlet-outlet opening I 8a by means of a first branch passage 8y and with a colorant bucket branch inlet-outlet opening II 8b by means of a second branch passage 8x. As shown in FIG. 5a and FIG. 5b, the valve core is provided with an axial passage 7e, and a radial passage I 7b, a radial passage II 7c, and a radial passage III 7d respectively connect with the axial passage 7e; the valve core is provided in the surface thereof with an arc groove passage 7a. The arc groove passage 7a is aimed at realizing colorant passages in two positions of the surface of the valve core. However, the passage is not limited to the arc groove passage; for example, a through hole is directly bored in the surface to achieve penetration of two positions of the surface. The arc groove passage 7a and the radial passage I 7b correspond to the large pump inlet-outlet opening 5, and the axial passage 7e invariably connects with the small pump inlet-outlet opening 6.

Figure 7A:
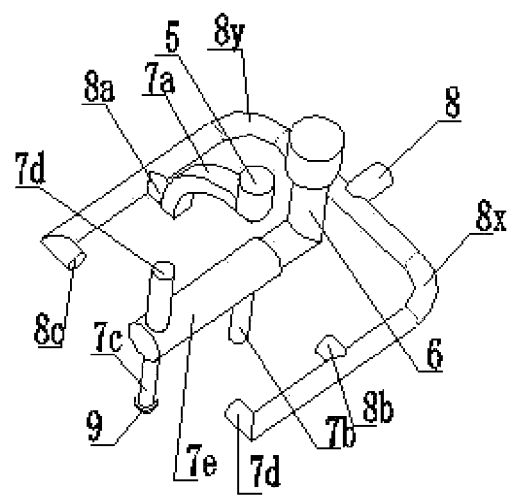
FIG. 7a is a diagram of a trace amount of colorant dispensing passage of the first control valve.

FIG. 7a shows a diagram of colorant passages in the rotary valve. When the radial passage II 7c is aligned to the colorant dispensing outlet 9, the arc groove 7a connects with the colorant bucket inlet-outlet opening I 8a; that is, the colorant from the large pump inlet-outlet opening returns to the colorant bucket through the arc groove 7a, the colorant bucket inlet-outlet opening I 8a, and the first branch passage 8y; the small pump inlet-outlet opening 6 connects with the axial passage 7e that connects with the radial passage II 7c, and the radial passage II 7c dispenses a trace amount of colorant via the colorant dispensing outlet 9 with other passages being closed.

Figure 7B:
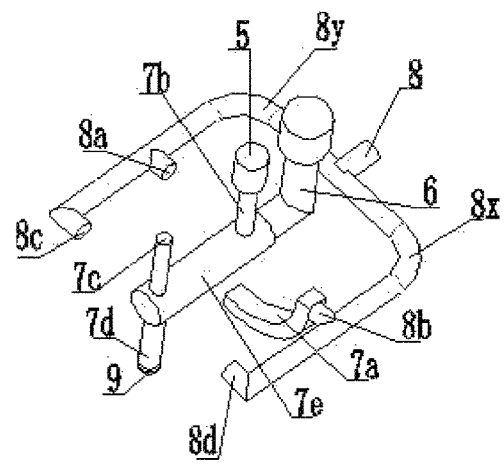
FIG. 7b is a diagram of an abundant colorant dispensing passage of the first control valve.

As shown in FIG. 7b, when the radial passage III 7d is aligned to the colorant dispensing outlet 9, the radial passage I 7b connects with the large pump inlet-outlet opening 5; that is, the large pump inlet-outlet opening 5 and the small pump inlet-outlet opening 6 both connect with the radial passage III 7*d* by means of the axial passage 7*e*, and the radial passage III 7*d* dispenses abundant colorant with other passages being closed.

Figure 7C:
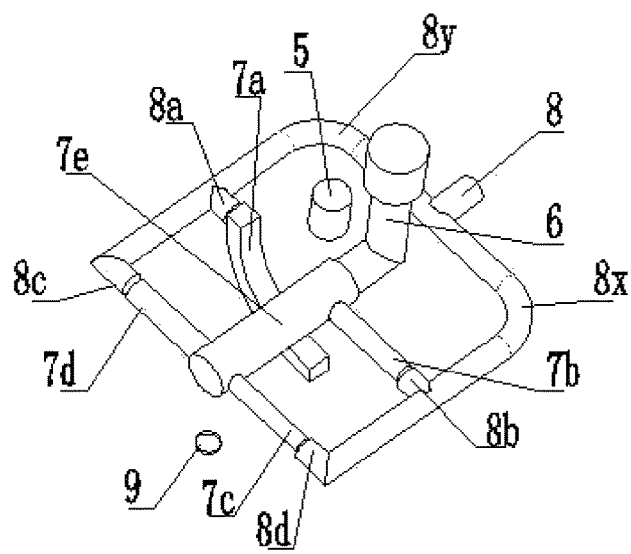
FIG. 7c is a diagram of a colorant suction passage of the first control valve.

As shown in FIG. 7*c*, when the radial passage I 7*b* connects with the colorant bucket branch inlet-outlet opening II 8*b*, the small pump inlet-outlet opening 6 connects with the colorant bucket by means of the axial passage 7*e*, the radial passage I 7*b*, and the colorant bucket branch inlet-outlet opening II 8*b* for suction of colorant.

Figure 7D:
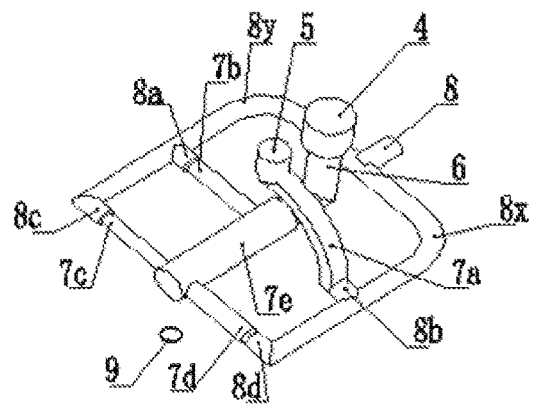
FIG. 7d is a diagram of another colorant suction passage of the first control valve.

As shown in FIG. 7*d*, when the radial passage I 7*b* connects with the colorant bucket branch inlet-outlet opening I 8*a*, the large pump inlet-outlet opening 5 connects with the colorant bucket inlet-outlet opening 8 by means of the arc groove passage 7*a*, the colorant bucket branch inlet-outlet opening II8*b*, and the second branch passage 8*x*, while the small pump inlet-outlet opening 6 also connects with the colorant bucket inlet-outlet opening 8 by means of the axial passage 7*e*, the radial passage I7*b*, the colorant bucket branch inlet-outlet opening I8*a* and the first branch passage 8*y* for suction of colorant, based on an assumption of no colorant bucket branch inlet-outlet opening III8*c* and colorant bucket branch inlet-outlet opening IV8*d* being present.

As shown in FIG. 6*a* and FIG. 6*b*, the colorant bucket inlet-outlet opening 8 is branched into the colorant bucket inlet-outlet opening I 8*a* and the colorant bucket inlet-outlet opening II 8*b*, both of which are located at the sides of the valve core, and further branched into a colorant bucket inlet-outlet opening III 8*c* and a colorant bucket inlet-outlet opening IV 8*d*, both of which are located at sides of the valve core; the colorant bucket inlet-outlet opening III 8*c* and the colorant bucket inlet-outlet opening IV 8*d* correspond to the radial passage II 7*c* and the radial passage III 7*d*; (1) as shown in FIG. 7*c*, when the radial passage I 7*b* connects with the colorant bucket passage inlet-outlet opening II 8*b*, the radial passage III 7*d* connects with the colorant bucket branch inlet-outlet opening III 8*c*, while the radial passage II 7*c* connects with the colorant bucket branch inlet-outlet opening IV 8*d*, and the small pump inlet-outlet opening 6 connects with the colorant bucket for suction of colorant; (2) as shown in FIG. 7*d*, when the radial passage I 7*b* connects with the colorant bucket passage inlet-outlet opening I 8*a*, the radial passage III 7*d* connects with the colorant bucket branch inlet-outlet opening IV 8*d*, the radial passage II 7*c* connects with the colorant bucket branch inlet-outlet opening III 8*c*, and the large pump inlet-outlet opening 5 and the small pump inlet-outlet opening 6 connect with the colorant bucket for suction of colorant.

Figure 10A:
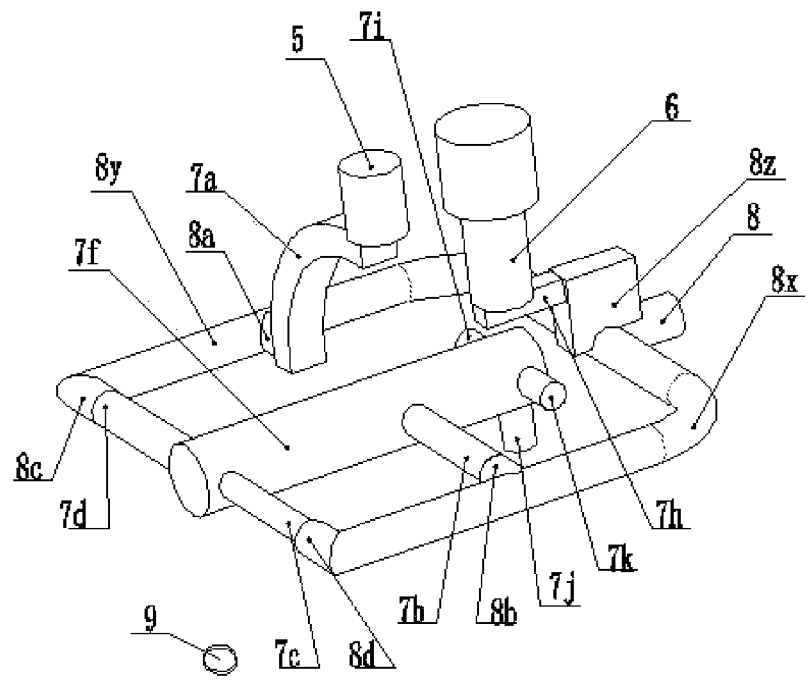
FIG. 10a is a diagram of a colorant suction passage of the control valve with the second structure.
Figure 10B:
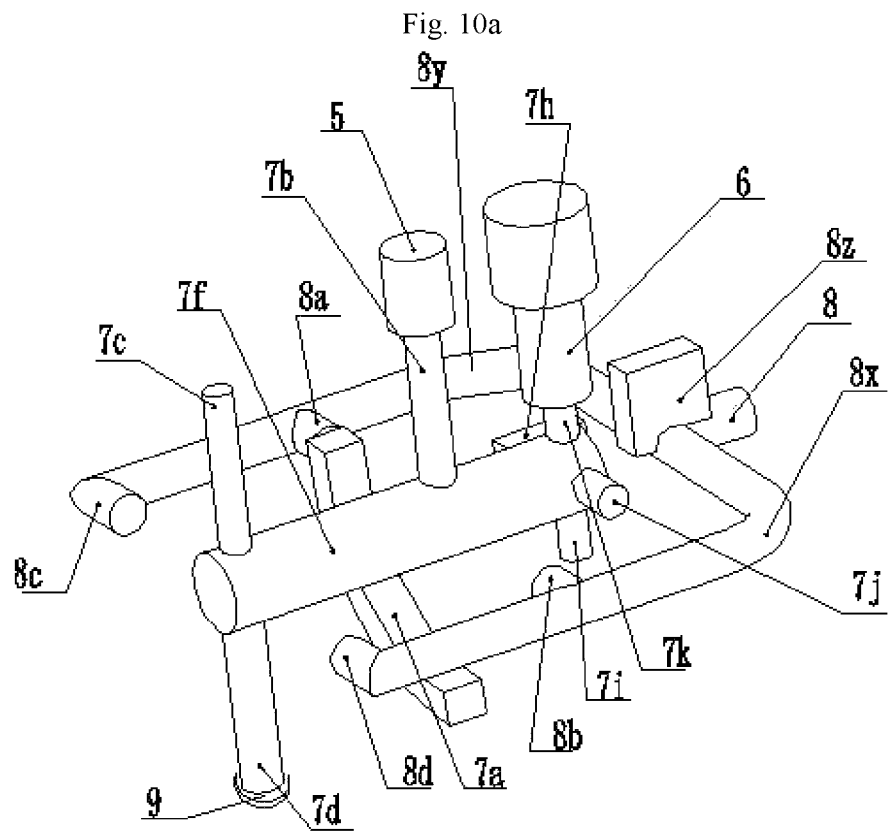
FIG. 10b is a diagram of an abundant colorant dispensing passage of the control valve with the second structure.

FIG. 8*a*, FIG. 8*b*, FIG. 9*a*, and FIG. 9*b* show diagrams of another structure of the control valve. The control valve comprises a valve body II and a valve core II. The valve body II is provided with a large pump inlet-outlet opening 5 and a small pump inlet-outlet opening 6, a colorant bucket inlet-outlet opening 8 and a colorant dispensing outlet 9, wherein the colorant bucket inlet-outlet opening 8 connects with the colorant bucket branch inlet-outlet opening I8*a* by means of the first branch passage 8*y* and with colorant bucket branch inlet-outlet opening II 8*b* by means of the second branch passage 8*x*; the colorant bucket inlet-outlet opening 8 is provided with a third branch passage 8*z*; the valve core II is provided with an axial passage 7*f*; a radial passage I7*b*, a radial passage I17*c*, and a radial passage III7*d* respectively connect with the axial passage 7*f*; the valve core II is provided in the surface thereof with an arc groove passage 7*a*; the arc groove passage 7*a* and the radial passage I7*b* correspond to the large pump inlet-outlet opening 5; a radial small pump passage I 7*i*, a radial small pump passage II 7*j*, a radial small pump passage III 7*k* and an axial small pump passage 7*h* are disposed axially spaced apart by 90 degrees on the part of the axial passage that corresponds to the small pump inlet-outlet opening 6:

(1) in FIG. 10*a*, when the radial passage I7*b* connects with the colorant bucket branch inlet-outlet opening II8*b*, the large pump inlet-outlet opening 5 connects with the arc groove passage 7*a* and the colorant bucket passage branch inlet-outlet opening I8*a*, and connects with the colorant bucket inlet-outlet opening 8 by means of the first branch passage 8*y*; and the small pump inlet-outlet opening 6 connects with the colorant bucket inlet-outlet opening 8 by means of the axial small pump passage 7*h* and the third branch passage 8*z* for suction of colorant with other passages being closed;

(2) in FIG. 10*b*, when the radial passage III7*d* is aligned to the colorant dispensing outlet 9, the large pump inlet-outlet opening 5 connects with the axial passage 7*f* by means of the radial passage I7*b*; the small pump inlet-outlet opening 6 connects with the axial passage 7*f* by means of the radial small pump passage II17*k*; that is, the large pump inlet-outlet opening 5 and the small pump inlet-outlet opening 6 both connect with the radial passage III7*d* by means of the axial passage 7*f*, and the radial passage III 7*d* dispenses abundant colorant with other passages being closed.

Figure 10C:
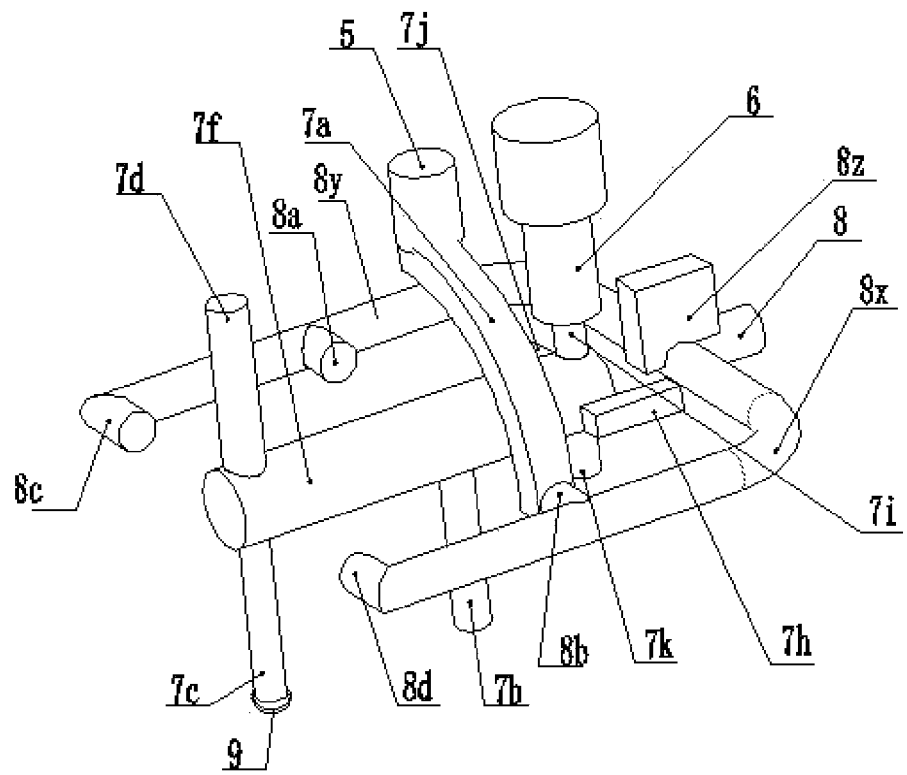
FIG. 10c is a diagram of a trace amount of colorant dispensing passage of the control valve with the second structure.

(3) in FIG. 10*c*, when the radial passage I17*c* is aligned to the colorant dispensing outlet 9, the arc groove 7*a* connects with the colorant bucket inlet-outlet opening II8*b*; that is, the colorant from the large pump inlet-outlet opening 5 returns via the second branch passage 8*x*; the small pump inlet-outlet opening 6 connects with the axial passage 7*f* by means of a radial small pump passage I7*i*; the axial passage 7*f* connects with the radial passage I17*c*, and the radial passage I17*c* dispenses a trace amount of colorant that is dispensed through the colorant dispensing outlet 9 with other passages being closed, all based on an assumption that the colorant bucket branch inlet-outlet opening III8*c* and the colorant bucket branch inlet-outlet opening IV8*d* are not present.

Figure 8A:
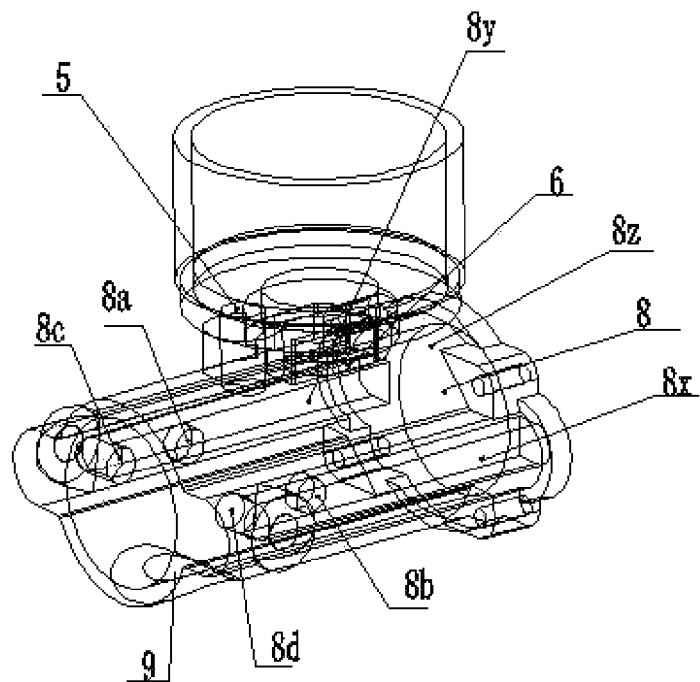
FIG. 8a is a structural diagram of a valve body of a control valve with a second structure.
Figure 8B:
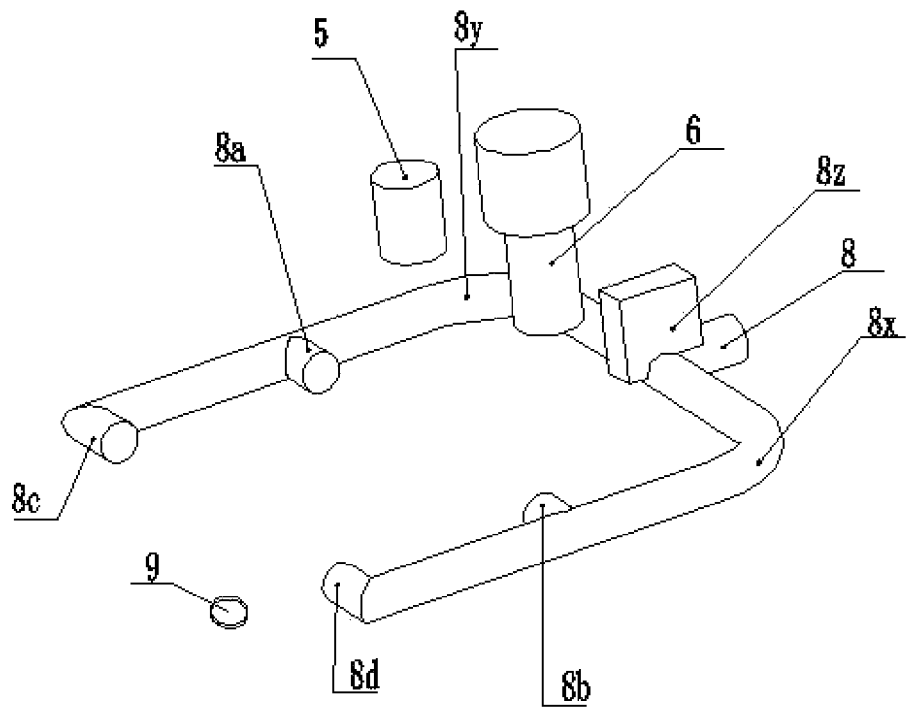
FIG. 8b is a diagram of a passage of the valve body of the control valve with the second structure.
Figure 9A:
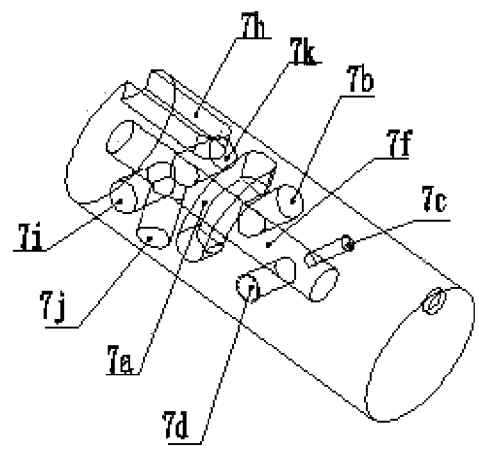
FIG. 9a is a structural diagram of a valve core of the control valve with the second structure.
Figure 9B:
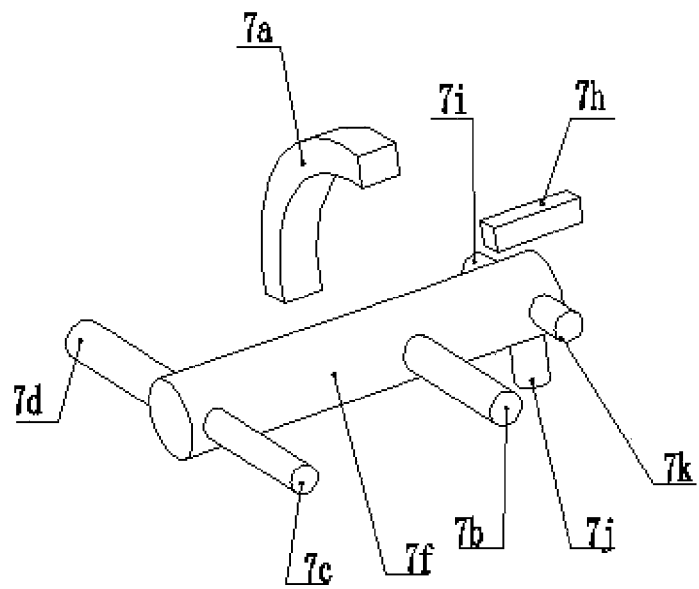
FIG. 9b is a diagram of a passage of the valve core of the control valve with the second structure.
Figure 10D:
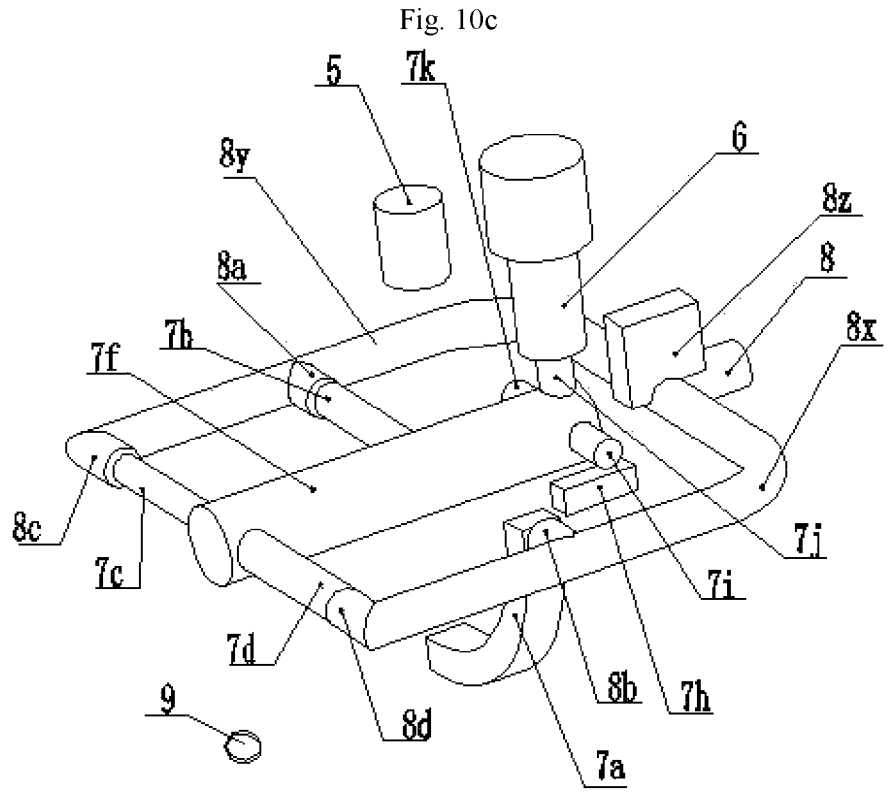
FIG. 10d is a diagram of a pump cleaning passage of the control valve with the second structure.

As shown in FIGS. 8*a* and 8*b*, the colorant bucket inlet-outlet opening 8 is branched into the colorant bucket inlet-outlet opening I 8*a* and the colorant bucket inlet-outlet opening II 8*b*, both of which are located at the sides of the valve core, and further branched into the colorant bucket inlet-outlet opening III 8*c* and the colorant bucket inlet-outlet opening IV 8*d*, both of which are located at the sides of the valve core; the colorant bucket inlet-outlet opening III 8*c* and the colorant bucket inlet-outlet opening IV 8*d* correspond to the radial passage II 7*c* and the radial passage III 7*d*; (1) as shown in FIG. 10*a*, when the radial passage I 7*b* connects with the colorant bucket passage inlet-outlet opening II 8*b*, the radial passage III 7*d* connects with the colorant bucket branch inlet-outlet opening III 8*c*, while the radial passage II 7*c* connects with the colorant bucket branch inlet-outlet opening IV 8*d* for suction of colorant;

(2) as shown in FIG. 10*d*, when the radial passage I 7*b* connects with the colorant bucket passage inlet-outlet opening I 8*a*, the radial passage II 7*c* connects with the colorant bucket branch inlet-outlet opening III 8*c*, while the radial passage III 7*d* connects with the colorant bucket branch inlet-outlet opening IV 8*d*; the small pump inlet-outlet opening 6 connects with the colorant bucket, while the large pump inlet-outlet opening is closed; and in addition to suction of little colorant, the colorant at the exits of the radial passage II 7*c* and the radial passage III 7*d* may be washed away through suction and drainage of the colorant.

Figure 11:
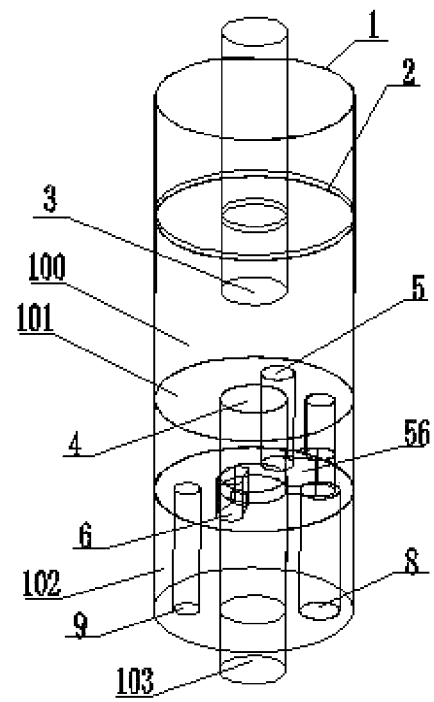
FIG. 11 is a diagram of an overall structure of a control valve with a third structure.
Figure 12A:
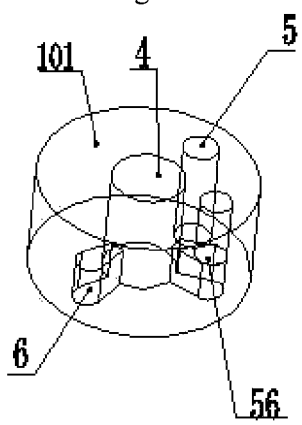
FIG. 12a is a structural diagram of a rotary valve core of a control valve with the third structure.
Figure 12B:
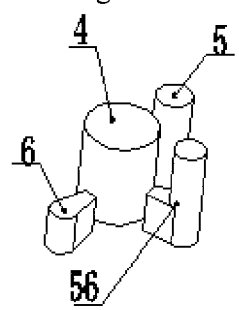
FIG. 12b is a diagram of a passage of the rotary valve core of the control valve with the third structure.
Figure 13A:
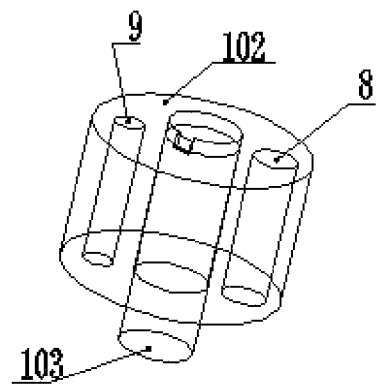
FIG. 13a is a structural diagram of a base for a large cylinder of the control valve with the third structure.
Figure 13B:
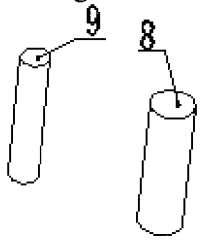
FIG. 13b is a diagram of a passage of the base for the large cylinder of the control valve with the third structure.
Figure 14A:
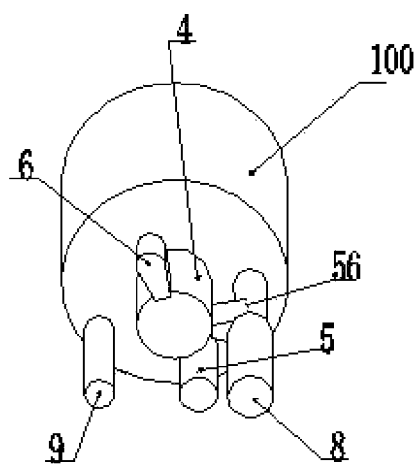
FIG. 14a is a diagram of a colorant suction passage of the control valve with the third structure.
Figure 14B:
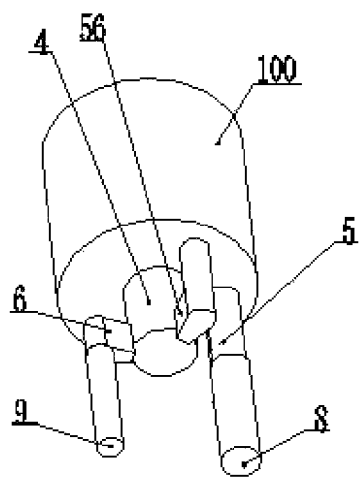
FIG. 14b is a diagram of a trace amount of colorant passage dispensing passage of the control valve with the third structure.
Figure 14C:
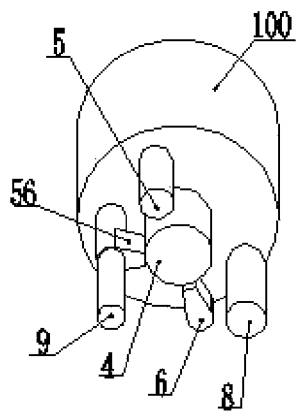
FIG. 14c is a diagram of an abundant colorant dispensing passage of the control valve with the third structure.

FIG. 11 is a diagram of an overall structure of the control valve in the present invention. As shown in FIG. 11, FIG. 13*a* and FIG. 13*b*, a base 102 for a large cylinder 1 is provided with a dispensing outlet 9 and a colorant bucket passage 8; a rotating shaft 103 is disposed in the axis of the base 102; a rotary valve core IV 101 is disposed in the large cylinder 1. As shown in FIG. 12a and FIG. 12b, a small cylinder 4 is disposed in the axis of the rotary valve core IV 101, which radially extends out of the small pump inlet-outlet opening 6; a large pump inlet-outlet opening 5 is arranged outside the small cylinder 4, and the small cylinder 4 radially extends out of another inlet-outlet opening that connects with another large pump inlet-outlet opening to constitute a combined inlet-outlet opening 56. Thus, the valve core 101 is rotated such that: (1) as shown in FIG. 14a, the combined inlet-outlet opening 56 is aligned to the colorant bucket passage 8 for suction of colorant, allowing colorant 100 to flow into the cylinder; (2) as shown in FIG. 14b, the small pump inlet-outlet opening 6 is aligned to the dispensing outlet 9 to dispense a trace amount of colorant, and the large pump inlet-outlet opening 5 connects with the colorant bucket inlet-outlet opening 8, thereby allowing return from the large pump inlet-outlet opening 5 to the colorant bucket; (3) as shown in FIG. 14c, the large pump inlet-outlet opening 5 or the combined inlet-outlet opening 56 is aligned to the dispensing outlet 9 to dispense abundant colorant.

Driving for the large reciprocating part in the present invention includes manual driving, step motor driving, and servo motor driving. Position changeover of the control valve in the present invention includes changeover achieved manually, or by a step motor, a synchronous motor or a slowdown motor with position changeover control. By changing the directions and positions of the control valve, the objectives of colorant suction, a trace amount of colorant dispensing, abundant colorant dispensing, air removal and pump cleaning may be achieved with guaranteed accuracy and efficiency of colorant dispensing.

The control valve provided in the present invention is not limited to the plunger pump, the piston pump or the folding pump as described above, and is also applicable to any pump with two dispensing systems, for example, a pump with two measuring cylinders arranged abreast disclosed in patent No. WO2014139135A.

The invention claimed is:

1. A control valve for pouring color paste in both large amount and small amount, comprising:
   a valve body; and
   a valve core disposed in the valve body,
   wherein the valve body is provided with a large pump inlet-outlet opening, a small pump inlet-outlet opening, a colorant bucket inlet-outlet opening, and a colorant dispensing outlet;
   the valve core, which is provided with a passage, is rotated to allow connection of the large pump inlet-outlet opening and the small pump inlet-outlet opening with a colorant bucket or dispensing thereof, with at least three connecting structures being involved:
   (1) where the large pump inlet-outlet opening connects with the colorant bucket; the small pump inlet-outlet opening connects with the colorant bucket; and/or the large pump inlet-outlet opening and the small pump inlet-outlet opening both connect with the colorant bucket;
   (2) where single dispensing via the large pump inlet-outlet opening or dispensing via both the large pump inlet-outlet opening and the small pump inlet-outlet opening is allowed; alternatively, the large pump inlet-outlet opening connects with the colorant dispensing outlet for dispensing, or the large pump inlet-outlet opening and the small pump inlet-outlet opening both connect with the colorant dispensing outlet for dispensing;
   (3) where single dispensing via the small pump inlet-outlet opening is allowed, or the small pump inlet-outlet opening connects with the colorant dispensing outlet for dispensing,
   wherein the colorant bucket inlet-outlet opening connects with a colorant bucket branch inlet-outlet opening I by means of a first branch passage and with a colorant bucket branch inlet-outlet opening II by means of a second branch passage; the valve core is provided with an axial passage, and a radial passage I, a radial passage II, and a radial passage III respectively connect with the axial passage; the valve core is provided in surface thereof with a passage; the passage and the radial passage I correspond to the large pump inlet-outlet opening, and the axial passage connects with the small hump inlet-outlet opening.

2. The control valve for pouring color paste in both large amount and small amount of claim 1, wherein the axial passage connecting with the small pump inlet-outlet opening by means that the axial passage invariably connects with the small pump inlet-outlet opening; also:
   (1) when the radial passage I connects with the colorant bucket branch inlet-outlet opening II, the radial passage I connects with the colorant bucket for suction of colorant; when the radial passage I connects with the colorant bucket passage branch inlet-outlet opening I; the passage and the radial passage I both connect with the colorant bucket passage inlet-outlet opening for suction of colorant;
   (2) when the radial passage III is aligned to the colorant dispensing outlet, the radial passage I connects with the large pump inlet-outlet opening; that is, the large pump inlet-outlet opening and the small pump inlet-outlet opening both connect with the radial passage III by means of the axial passage, and the radial passage III dispenses large amount of the colorant with other passages being closed;
   (3) when the radial passage II is aligned to the colorant dispensing outlet, the passage connects with the colorant bucket inlet-outlet opening I; that is, the colorant from the large pump inlet-outlet opening returns; the small pump inlet-outlet opening connects with the axial passage that connects with the radial passage II, and the radial passage II dispenses a small amount of the colorant via the colorant dispensing outlet with other passages being closed.

3. The control valve for pouring color paste in both large amount and small amount of claim 2, wherein the colorant bucket inlet-outlet opening is branched into the colorant bucket inlet-outlet opening I and the colorant bucket inlet-outlet opening II, both of the colorant bucket inlet-outlet opening I and the colorant bucket inlet-outlet opening II are located at sides of the valve core, and further branched into a colorant bucket inlet-outlet opening III and a colorant bucket inlet-outlet opening IV, both of the colorant bucket inlet-outlet opening III and the colorant bucket inlet-outlet opening IV are located at sides of the valve core; the colorant bucket inlet-outlet opening III and the colorant bucket inlet-outlet opening IV correspond to the radial passage II and the radial passage III; (1) when the radial passage I connects with the colorant bucket passage inlet-outlet opening II, the radial passage III connects with the colorant bucket branch inlet-outlet opening III, while the radial passage II connects with the colorant bucket branch inlet-outlet opening IV, and the small pump inlet-outlet opening connects with the colorant bucket for suction of the colorant; (2) when the radial passage I connects with the colorant bucket passage inlet-outlet opening I, the radial passage III connects with the colorant bucket branch inlet-outlet opening IV, while the radial passage II connects with the colorant bucket branch inlet-outlet opening III, and the large pump inlet-outlet opening and the small pump inlet-outlet opening connect with the colorant bucket for suction of the colorant.

4. The control valve for pouring color paste in both large amount and small amount of claim 1, comprising: a valve body II and a valve core II, with the valve body II being provided with the large pump inlet-outlet opening, the small pump inlet-outlet opening, the colorant bucket inlet-outlet opening and the colorant dispensing outlet, wherein the colorant bucket inlet-outlet opening connects with the colorant bucket branch inlet-outlet opening I by means of the first branch passage and with the colorant bucket branch inlet-outlet opening II by means of the second branch passage, and the colorant bucket inlet-outlet opening is provided with a third branch passage; the valve core II is provided with an axial passage; the radial passage I, the radial passage II, and the radial passage III respectively connect with the axial passage; the valve core is provided in the surface thereof with the passage; the passage and the radial passage I correspond to the large pump inlet-outlet opening; a radial small pump passage I, a radial small pump passage II, a radial small pump passage III and an axial small pump passage are disposed axially spaced apart by 90 degrees on apart of the axial passage that corresponds to the small pump inlet-outlet opening; the axial passage connecting with the small pump inlet-outlet opening by means of passages means that the small pump inlet-outlet opening respectively connects with the radial small pump passage I, the radial small pump passage II, and the radial small pump passage III; also:

(1) when the radial passage I connects with the colorant bucket branch inlet-outlet opening II, the radial passage I is connected, and the passage connects with the colorant bucket passage branch inlet-outlet opening I; the small pump inlet-outlet opening connects with the colorant bucket inlet-outlet opening by means of the axial small pump passage for suction of the colorant with other passages being closed;

(2) when the radial passage III is aligned to the colorant dispensing outlet, the large pump inlet-outlet opening connects with the axial passage by means of the radial passage I, while the small pump inlet-outlet opening connects with the axial passage by means of the radial small pump passage III; that is, the large pump inlet-outlet opening and the small pump inlet-outlet opening both connects with the radial passage III by means of the axial passage, and the radial passage III dispenses large amount of the colorant with other passages being closed;

(3) when the radial passage II is aligned to the colorant dispensing outlet, the passage connects with the colorant bucket inlet-outlet opening II; that is, the colorant from the large pump inlet-outlet opening returns; the small pump inlet-outlet opening connects with the axial passage by means of the radial small pump passage I; the axial passage connects with the radial passage II, and the radial passage II dispenses an amount of the colorant that is dispensed through the colorant dispensing outlet with other passages being closed.

5. The control valve for pouring color paste in both large amount and small amount of claim 4, wherein the colorant bucket inlet-outlet opening is branched into the colorant bucket inlet-outlet opening I and the colorant bucket inlet-outlet opening II, both of the colorant bucket inlet-outlet opening I and the colorant bucket inlet-outlet opening II are located at sides of the valve core, and further branched into the colorant bucket inlet-outlet opening III and the colorant bucket inlet-outlet opening IV, both of the colorant bucket inlet-outlet opening III and the colorant bucket inlet-outlet opening IV are located at sides of the valve core; the colorant bucket inlet-outlet opening III and the colorant bucket inlet-outlet opening IV correspond to the radial passage II and the radial passage III; (1) when the radial passage I connects with the colorant bucket passage inlet-outlet opening II, the radial passage III connects with the colorant bucket branch inlet-outlet opening m, while the radial passage II connects with the colorant bucket branch inlet-outlet opening IV; (2) when the radial passage I connects with the colorant bucket passage inlet-outlet opening I, the radial passage II connects with the colorant bucket branch inlet-outlet opening III, while the radial passage III connects with the colorant bucket branch inlet-outlet opening IV.

6. A control valve for pouring color paste in both large amount and small amount, comprising:

a valve body; and a valve core disposed in the valve body, wherein the valve body is provided with a large pump inlet-outlet opening, a small pump inlet-outlet opening, a colorant bucket inlet-outlet opening, and a colorant dispensing outlet;

the valve core, which is provided with a passage, is rotated to allow connection of the large pump inlet-outlet opening and the small pump inlet-outlet opening with a colorant bucket or dispensing thereof with at least three connecting structures being involved:

(1) where the large pump inlet-outlet opening connects with the colorant bucket; the small pump inlet-outlet opening connects with the colorant bucket; and/or the large pump inlet-outlet opening and the small pump inlet-outlet opening both connect with the colorant bucket;

(2) where single dispensing via the large pump inlet-outlet opening or dispensing via both the large pump inlet-outlet opening and the small pump inlet-outlet opening is allowed; alternatively, the large pump inlet-outlet opening connects with the colorant dispensing outlet for dispensing, or the large pump inlet-outlet opening and the small pump inlet-outlet opening both connect with the colorant dispensing outlet for dispensing;

(3) where single dispensing via the small pump inlet-outlet opening is allowed, or the small pump inlet-outlet opening connects with the colorant dispensing outlet for dispensing, wherein the colorant dispensing outlet and the colorant bucket passage are arranged in a base for a large cylinder, and a rotary valve core is disposed in the large cylinder; a small cylinder is axially disposed on the rotary valve core, and radially extends out of the small pump inlet-outlet opening; the large pump inlet-outlet opening is arranged in an outer side of the small cylinder; the small cylinder radially extends out of another inlet-outlet opening that connects with another inlet-outlet opening of a large pump to form a combined inlet-outlet opening;

(1) the combined inlet-outlet opening is aligned to the colorant bucket passage for suction of colorant;

(2) the large pump inlet-outlet opening is aligned to the colorant dispensing outlet or the combined inlet-outlet opening is aligned to the dispensing outlet for dispensing of large amount of the colorant;

(3) the small pump inlet-outlet opening is aligned to the colorant dispensing outlet for dispensing of a small amount of the colorant.

7. The control valve for pouring color paste in both large amount and small amount of claim 6, wherein a rotating shaft is disposed in the base for the large cylinder, and connected to the rotary valve core to drive the rotary valve core to rotate.

8. The control valve for pouring color paste in both large amount and small amount of claim 6, wherein the rotating shaft is driven manually or by a motor.

* * * * *